United States Patent
Beaurepaire et al.

(10) Patent No.: US 10,859,383 B2
(45) Date of Patent: Dec. 8, 2020

(54) METHOD AND APPARATUS FOR GENERATING NAVIGATION GUIDANCE FOR AN INCOMPLETE MAP

(71) Applicant: HERE GLOBAL B.V., Eindhoven (NL)

(72) Inventors: Jerome Beaurepaire, Berlin (DE); Sven Krome, Berlin (DE)

(73) Assignee: HERE Global B.V., Eindhoven (NL)

( * ) Notice: Subject to any disclaimer, the term of this patent is extended or adjusted under 35 U.S.C. 154(b) by 360 days.

(21) Appl. No.: 15/981,527

(22) Filed: May 16, 2018

(65) Prior Publication Data

US 2019/0353486 A1 Nov. 21, 2019

(51) Int. Cl.
*G01C 21/28* (2006.01)
*G01C 21/20* (2006.01)
*G08G 1/14* (2006.01)

(52) U.S. Cl.
CPC ............ *G01C 21/28* (2013.01); *G01C 21/20* (2013.01); *G08G 1/146* (2013.01)

(58) Field of Classification Search
CPC ......... G01C 21/28; G01C 21/20; G08G 1/146
USPC ........................................................ 701/411
See application file for complete search history.

(56) References Cited

U.S. PATENT DOCUMENTS

| | | |
|---|---|---|
| 6,470,266 B1 | 10/2002 | Ito et al. |
| 9,057,622 B2 * | 6/2015 | Pfeifle ................ G01C 21/3469 |
| 2005/0261824 A1 | 11/2005 | Furukawa |
| 2010/0299059 A1 | 11/2010 | Vogel et al. |
| 2012/0056785 A1 | 3/2012 | Kuhlman et al. |
| 2013/0204525 A1 | 8/2013 | Pfeifle |
| 2016/0139689 A1 * | 5/2016 | Sutton .................... G06F 3/016 386/282 |

FOREIGN PATENT DOCUMENTS

DE 102004003452 A1 9/2005

OTHER PUBLICATIONS

Office Action for corresponding European Patent Application No. 19174730.2-1003, dated Oct. 14, 2019, 9 pages.
Rajabioun et al., "Intelligent Parking Assist", retrieved on Oct. 23, 2019 from http://minghsiehece.usc.edu/wp-content/uploads/2017/08/Rajabioun-Tooraj.pdf, 1 page.
Dolgov et al., "Detection of Principal Directions in Unknown Environments for Autonomous Navigation", Jun. 1, 2008, retrieved on Oct. 23, 2019 from http://www.roboticsproceedings.org/rss04/p10.pdf, 8 pages.

* cited by examiner

*Primary Examiner* — Khoi H Tran
*Assistant Examiner* — Rodney P King
(74) *Attorney, Agent, or Firm* — Ditthavong & Steiner, P.C.

(57) ABSTRACT

An approach is provided for generating navigation guidance for incomplete maps. The approach, for example, involves calculating, by a processor, a confidence level of one or more links of the navigation route based on a completeness of map data in an area including the navigation route. The approach also involves determining a specificity level of a navigation guidance command based on the confidence level. The approach further involves generating the navigation guidance command at the determined specificity level. The approach further involves presenting the navigation guidance command in a user interface of a navigation device.

20 Claims, 15 Drawing Sheets

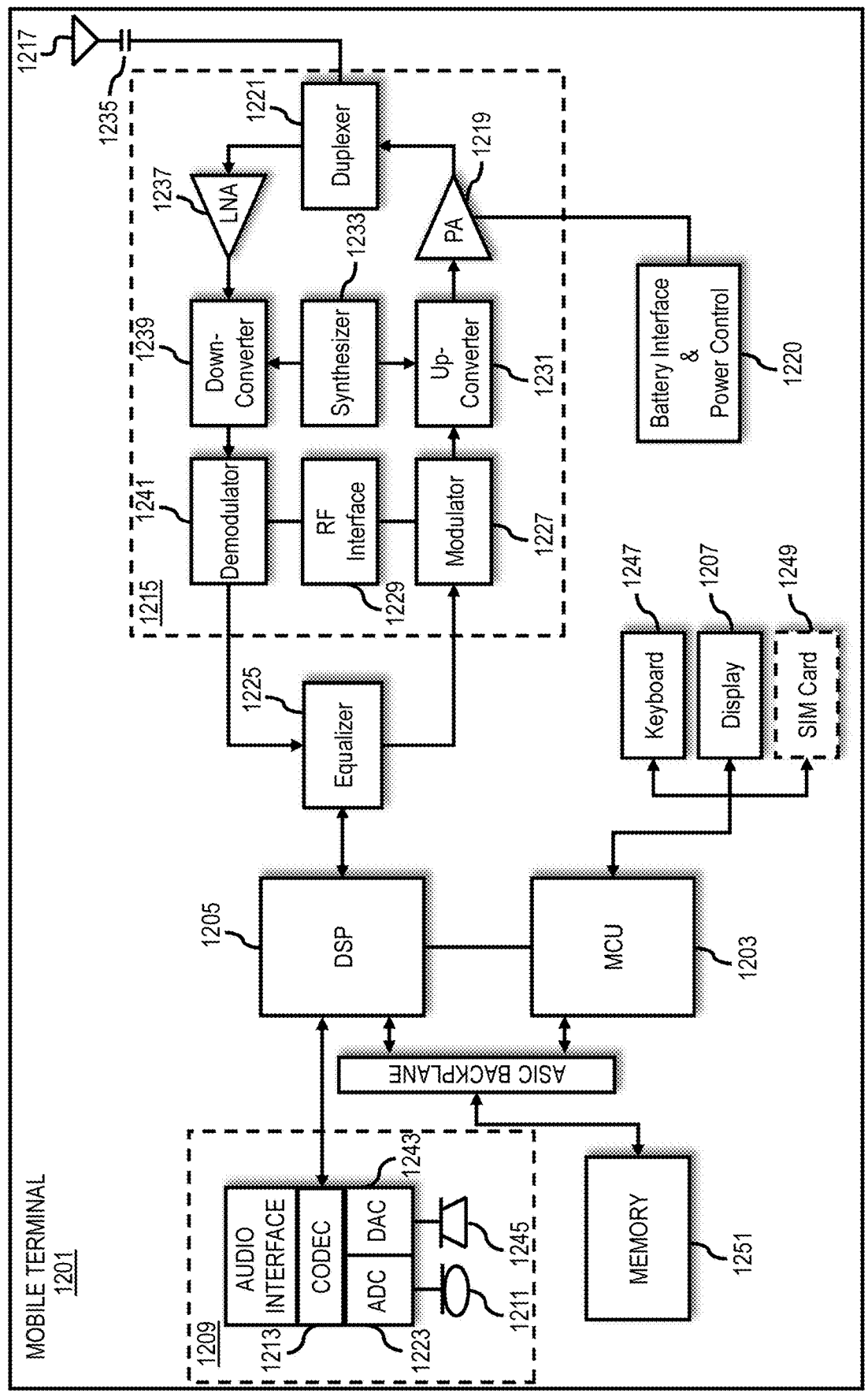

METHOD AND APPARATUS FOR GENERATING NAVIGATION GUIDANCE FOR AN INCOMPLETE MAP

BACKGROUND

Navigation and mapping services have greatly increased in popularity as drivers and other users become more reliant on them for routing guidance as they travel. Providing such navigation routing services is a continual challenge for service providers because they generally rely on having complete map data to provide accurate guidance commands. However, because of the vast geographic areas and structures (e.g., indoor parking structures) that must be mapped and the need to continually update the corresponding map data to account for changes or additions to the road network or related structures, acquiring complete and/or up-to-date map data may not always be possible. Accordingly, service providers face significant technical challenges to provide navigation guidance instructions when users (e.g., drivers, pedestrians, etc.) are traveling in areas or structures with incomplete, out-of-date, and/or no map data.

SOME EXAMPLE EMBODIMENTS

Therefore, there is a need for an approach for generating navigation guidance commands for areas or structures with incomplete maps.

According to one embodiment, a method comprises calculating a confidence level of one or more links of the navigation route based on a completeness of map data in an area (e.g., an indoor parking structure) including the navigation route. The method also comprises determining a specificity level of a navigation guidance command based on the confidence level. The method further comprises generating the navigation guidance command at the determined specificity level. The method further comprises presenting the navigation guidance command in a user interface of a navigation device.

According to another embodiment, an apparatus comprises at least one processor, and at least one memory including computer program code for one or more computer programs, the at least one memory and the computer program code configured to, with the at least one processor, cause, at least in part, the apparatus to calculate a confidence level of one or more links of the navigation route based on a completeness of map data in an area (e.g., an indoor parking structure) including the navigation route. The apparatus is also caused to determine a specificity level of a navigation guidance command based on the confidence level. The apparatus is further caused to generate the navigation guidance command at the determined specificity level. The apparatus is further caused to present the navigation guidance command in a user interface of a navigation device.

According to another embodiment, a computer-readable storage medium carries one or more sequences of one or more instructions which, when executed by one or more processors, cause, at least in part, an apparatus to calculate a confidence level of one or more links of the navigation route based on a completeness of map data in an area (e.g., an indoor parking structure) including the navigation route. The apparatus is also caused to determine a specificity level of a navigation guidance command based on the confidence level. The apparatus is further caused to generate the navigation guidance command at the determined specificity level. The apparatus is further caused to present the navigation guidance command in a user interface of a navigation device.

According to another embodiment, an apparatus comprises means for calculating a confidence level of one or more links of the navigation route based on a completeness of map data in an area (e.g., an indoor parking structure) including the navigation route. The apparatus also comprises means for determining a specificity level of a navigation guidance command based on the confidence level. The apparatus further comprises means for generating the navigation guidance command at the determined specificity level. The apparatus further comprises means for presenting the navigation guidance command in a user interface of a navigation device.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing any of the methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 12 is a diagram of a mobile terminal that can be used to implement an embodiment.

DESCRIPTION OF SOME EMBODIMENTS

Examples of a method, apparatus, and computer program for providing navigation guidance for incomplete maps are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
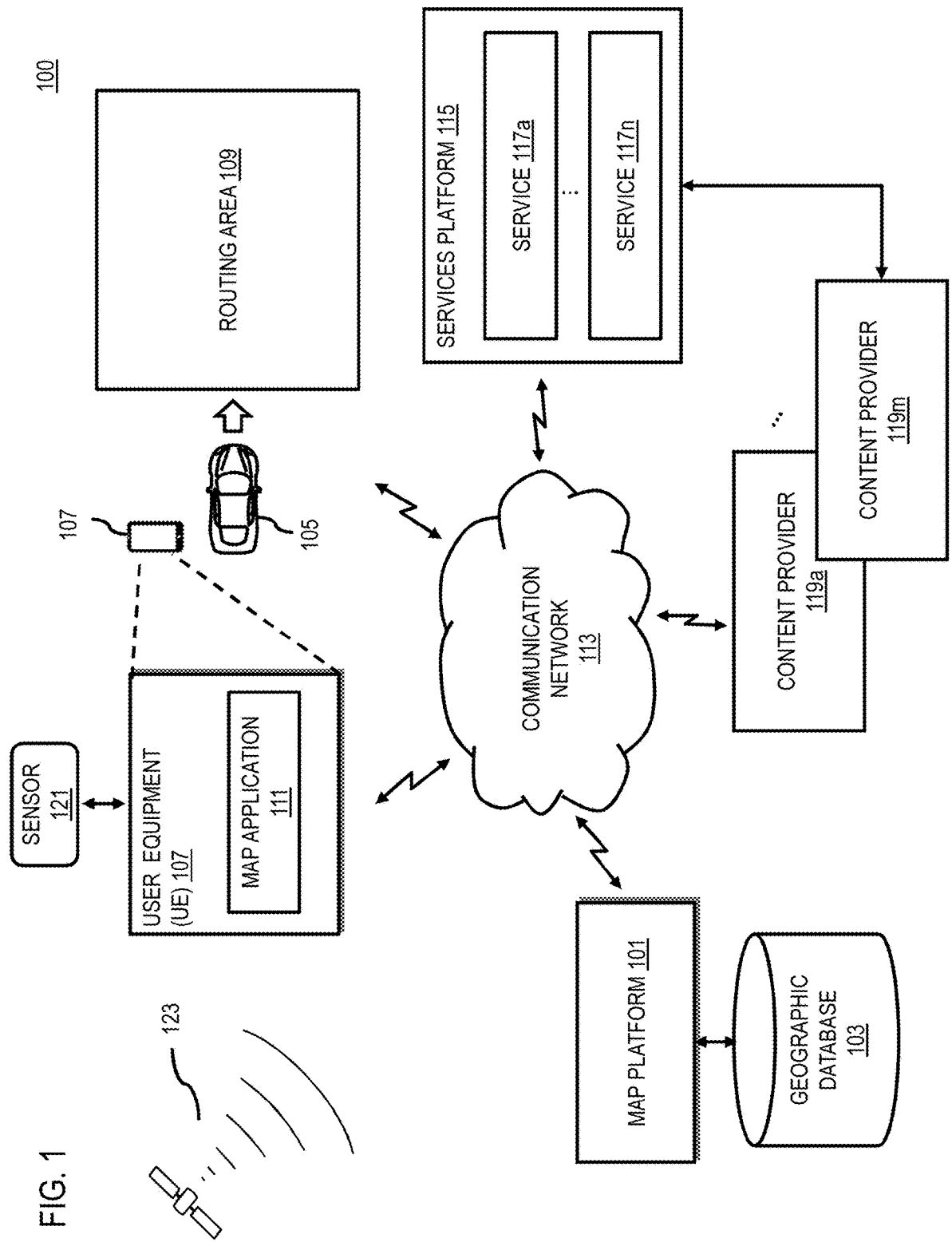
FIG. 1 is a diagram of a system capable of providing navigation guidance for incomplete maps, according to one embodiment.

FIG. 1 is a diagram of a system 100 capable of providing navigation guidance for incomplete maps, according to one embodiment. Map service providers (e.g., providers operating a map platform 101 as shown in FIG. 1) historically maintain a geographic database 103 for storing digital map data to represent one or more geographic areas for use in providing various location-based services. For example, service providers can map the roads, paths, etc. located in areas of interest (e.g., for both outdoor and indoor areas) as well as their attributes (e.g., functional class, bi-direction-ality, supported vehicles, number of lanes, etc.) to support navigation routing services. However, acquiring this mapping data can be resource intensive because the areas of interest that are to be mapped can span cities, regions, countries, or even a global scale.

Under one traditional approach, map service providers have used dedicated fleets of mapping vehicles equipped with sensors (e.g., location sensors such as GPS sensors, LiDAR, etc.) to drive along roads and paths to collect map data to populate the geographic database 103. This approach, however, is very resource intensive and provides for slow updates because the road networked must be driven by the mapping vehicles to first create the map and then driven again each time to update the map. As a result, mapping data can be incomplete for many areas, particularly areas that are difficult to reach by the mapping vehicles such areas that are not traditional roads (e.g., parking lots, parking structures, indoor areas, etc.), but which still support vehicular or pedestrian traffic. Other traditional map data collection processes such as crowd-sourced data collection can increase available map data. However, these crowd-sourced methods generally are not standardized and thus may still be incomplete because the resulting map data may not contain all attributes or details about a map area to populate the geographic database 103. As a result, there can be many geographic areas or structures (e.g., particularly indoor areas, parking structures, etc.) that may have incomplete map data.

When encountering areas with incomplete or no map data, traditional navigation routing services may provide no instructions or potentially erroneous or poor instructions (e.g., instructing the driver to turn the wrong onto a one-way street, turn where no road exists, miss potential new unmapped shortcuts, etc.). Accordingly, service providers face significant technical challenges to providing at least some level navigation guidance in areas with "incomplete" maps (e.g., maps that may indicate some geometry but may not have may not contain all attributes or details for an area).

Figure 2:
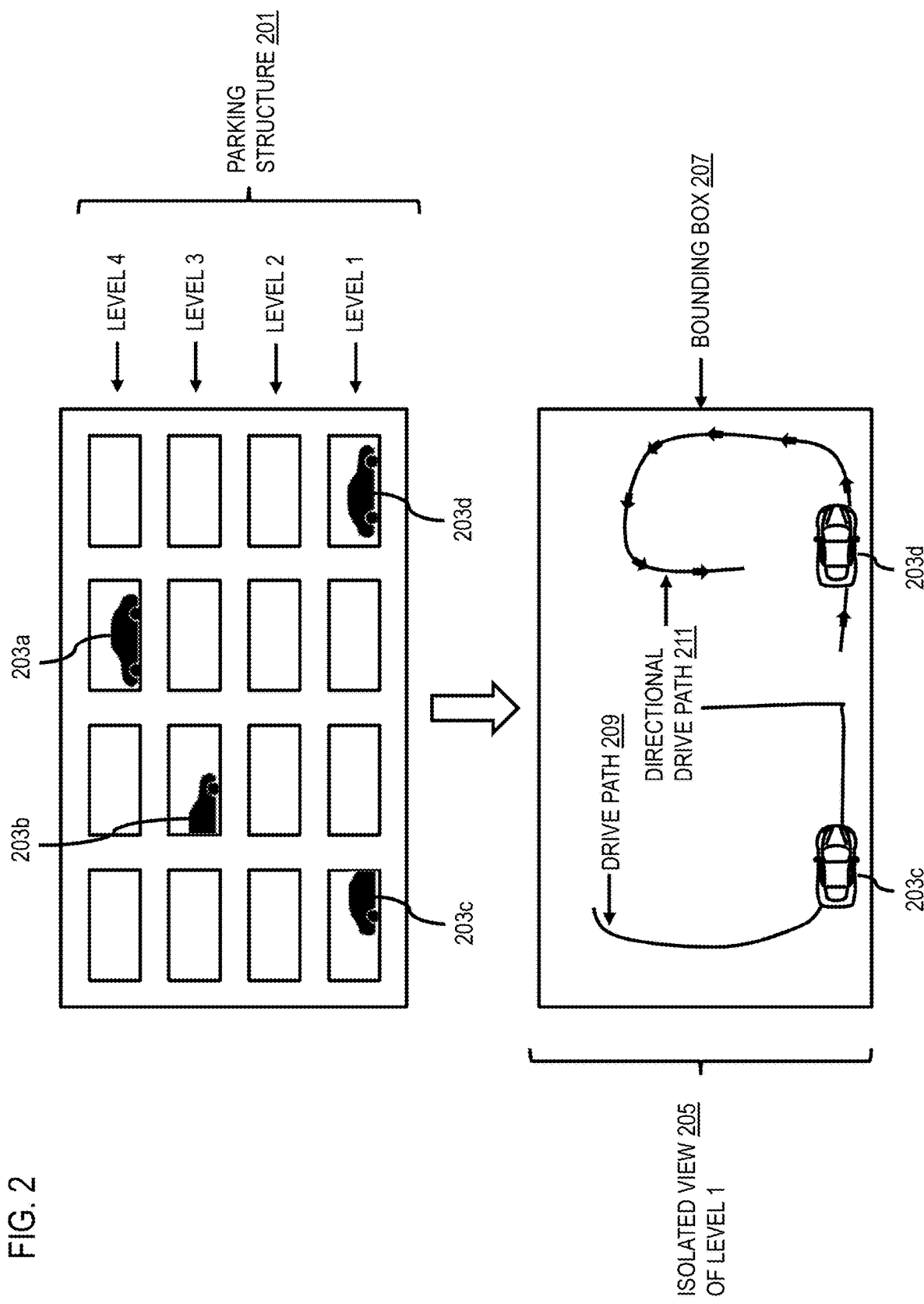
FIG. 2 is a diagram of an example parking structure with incomplete map data, according to one embodiment.

FIG. 2 illustrates of an example area (e.g., a parking structure 201) with incomplete map data, according to one embodiment. In this example, the parking structure 201 is a multi-level indoor parking facility (e.g., containing levels 1-4) that is mapped using probe data crowd-sourced from vehicles 203a-203d traveling in the parking structure 201. Because the probe data is crowd-sourced, the probe data provides coverage for only portions of the parking structure 201 and thus, the map data is incomplete. For example, the isolated view 205 of level 1 of the parking structure 201 illustrates a bounding box 207 that is used to select the probe data that corresponds to level 1. In this case, the probe data on level 1 includes a probe trajectory or drive path 209 (e.g., collected from vehicle 203c) that has no direction of travel information, and a directional drive path 211 (e.g., collected from vehicle 203d) that indicates a direction of travel. In one embodiment, the map platform 101 can use the drive paths to infer that a road or path exists along the path, and then the direction of travel to indicate a bi-directionality or uni-directionality of the determined road. In this case, the drive path 209 can be used to map roads but cannot be used to determine a bi-directionality attribute. Thus, the resulting map data would be incomplete. In contrast, the drive path 211 has directionality and can be used to determine more complete map data including both the road location and its bi-directionality attribute. In addition, because the probe data on level 1 is sparse and does not cover the entire level, the resulting map data would also be incomplete with respect to identifying roads or paths in areas of the parking structure 201 not covered by the probe data. Under traditional approaches, the map platform 101 would not be able to generate navigation guidance commands based on the incomplete map data.

To address these technical problems, the system 100 of FIG. 1 introduces a capability to allow users (e.g., drivers of vehicles 105, drivers/pedestrians via mobile devices such as user equipment (UE) 107, etc.) to be guided in areas (e.g., a routing area 109) which contain some geometry but are likely incomplete with respect to map data stored in the geographic database 103 (e.g., large parking structures 201) by computing and using a road link probability index (e.g., a confidence level indicating the completeness and/or accuracy of road link and/or any of its attributes) that would be used for map rendering, routing, and/or guidance. By way of example, incompleteness of map data can be determined based on areas that the system 100 (e.g., the map platform 101) does not know that it does not know. Such areas, for instance, can be determined based on the map platform 101 identifying areas for which no probe data or other map data have been reported or previously generated.

In addition or alternatively, incompleteness of map data can also be based on areas that the system 100 knows that it does not know. For example, if the map data indicates the presence of a building with five floors, but the geographic database 103 has map data or probe data for only four of the five known floors, the system 100 can infer that the map data is incomplete or missing for at least one floor. Areas that the system 100 knows that it does not know can also be identified by querying for areas where probe data is sparse (e.g., where probe data samples have been collected from fewer than a minimum number of vehicles 105 and or UEs 107).

In one embodiment, when the system 100 receives a request for navigation guidance for a route that falls in a routing area 109 with incomplete map data (e.g., a request to navigate in the large parking structure 201), the system 100 can retrieve or otherwise acquire existing sensor data (e.g. probe data) from multiple vehicles 105 and/or UEs 107 that have traveled in the routing area 109 (e.g., retrieved from the geographic database 103), and determines the paths driven or traveled inside the routing area 109. In one embodiment, the system 100 then computes a link probability index or a confidence level for a road link or path that is on computed route through the routing area 109. The confidence level indicates, for instance, a computed certainty level for an attribute of the link (e.g., the link's existence, bi-directionality, etc.). Based on the confidence level or probability index, guidance and routing are provided to the user.

In one embodiment, the system 100 can then generate variable route guidance commands based on the computed confidence level or probability index. The system 100 can vary the specificity of the guidance command based on the confidence level of the links to which the command applies. This variability minimizes the potential for the system 100 to provide incorrect or poor guidance commands by matching the level of detail (e.g., specificity level) of the wording in the command or other form of representation (e.g., visual representation) of the command with the confidence level of the road links associated with the command. For example, if a link has a low computed confidence level of existing (e.g., because the system 100 has less than a threshold number of probe data samples to confirm the link), the system can provide a less specific guidance command such as "head East at the first opportunity" or "head towards landmark A visible to the East". In contrast, if there is high confidence in the existence of the link (e.g., confirmed by probe data from more than a threshold number or probe data samples), the system 100 can issue a traditional highly specific command such as "turn right on Road A in 200 meters". In this way, the system 100 advantageously provides at least some guidance commands while minimizing potential errors by being too specific with the command in areas where the users are usually left on their own (e.g., provided no guidance command from traditional mapping systems).

Figure 3:
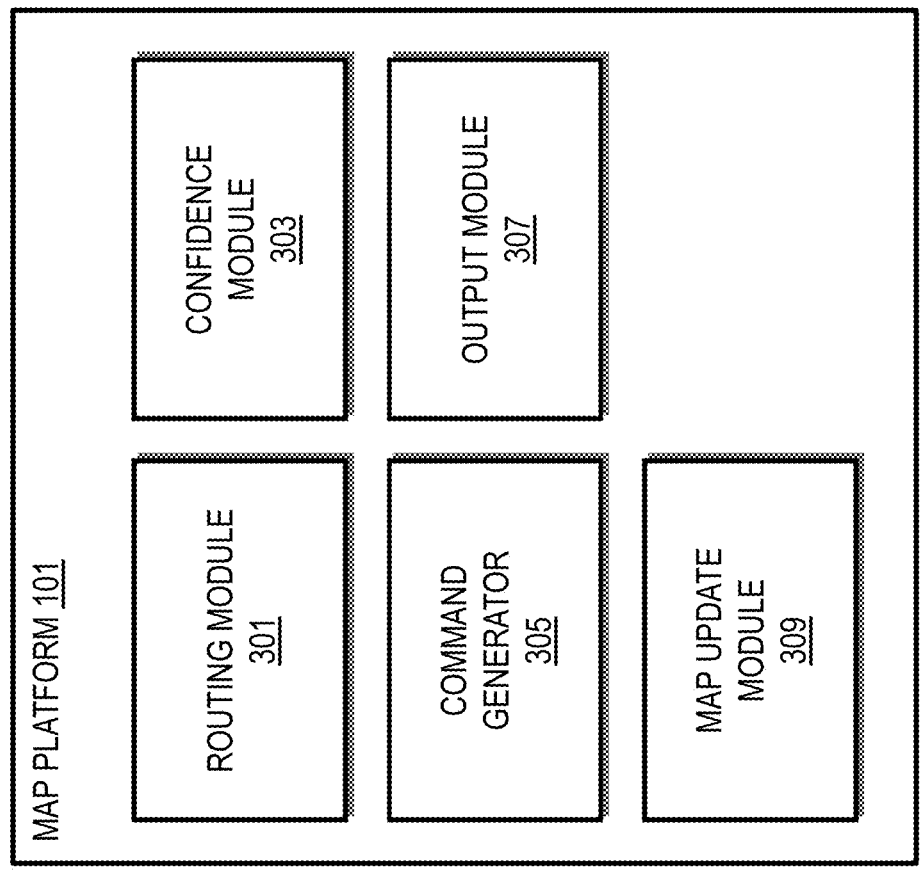
FIG. 3 is a diagram of the components of the mapping platform, according to one embodiment.

FIG. 3 is a diagram of the components of a map platform 101, according to one embodiment. By way of example, the map platform 101 includes one or more components for generating guidance commands for incomplete maps according to the various embodiments described herein. It is contemplated that the functions of these components may be combined or performed by other components of equivalent functionality. In this embodiment, the map platform 101 includes a routing module 301, confidence module 303, command generator 305, output module 307, and map update module 309. The above presented modules and components of the map platform 101 can be implemented in hardware, firmware, software, or a combination thereof. In one embodiment, the map application 111 of the UE 107, services platform 115, and/or any of the services 117a-117n (also collectively referred to as services 117) of the services platform 115 can perform the functions of the map platform 101 alone or in combination with the map platform 101 (e.g., through connectivity to the map platform 101 over the communication network 113). In one embodiment, one or more of the modules 301-307 may be implemented as a cloud-based service, local service, native application, or combination thereof. The functions of the map platform 101 and the modules 301-307 are discussed with respect to FIGS. 4-8 below.

Figure 4:
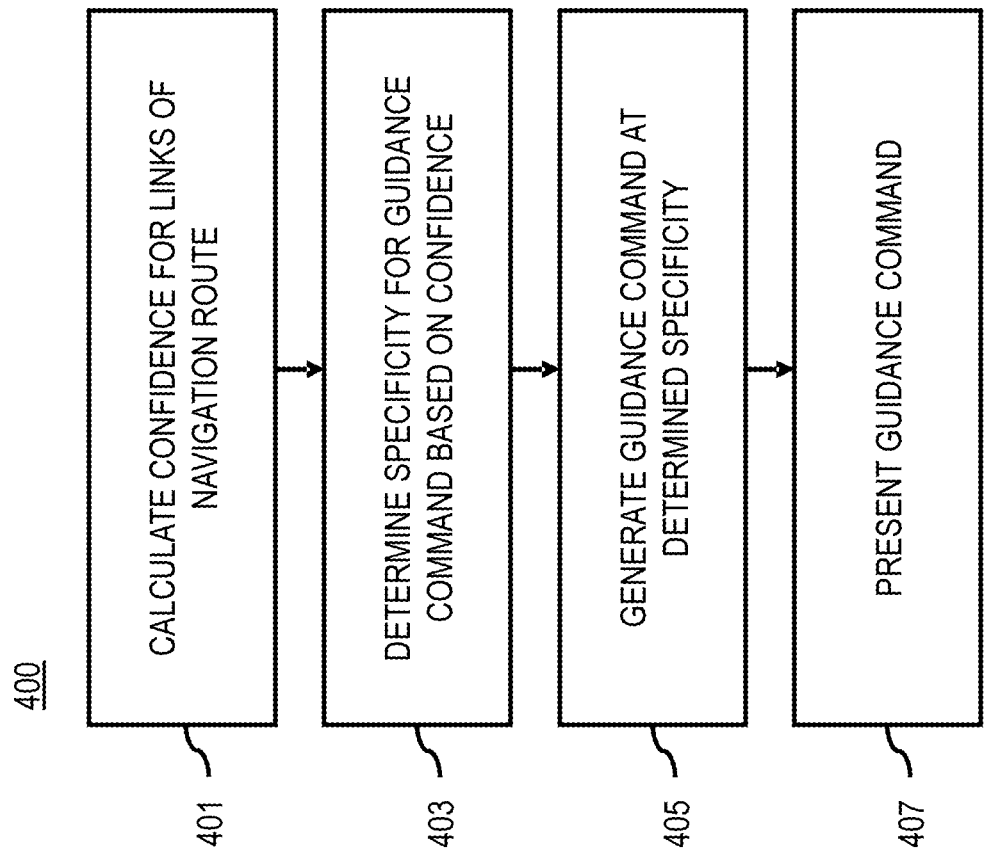
FIG. 4 is a flowchart of a process for providing navigation guidance for incomplete maps, according to one embodiment.
Figure 11:
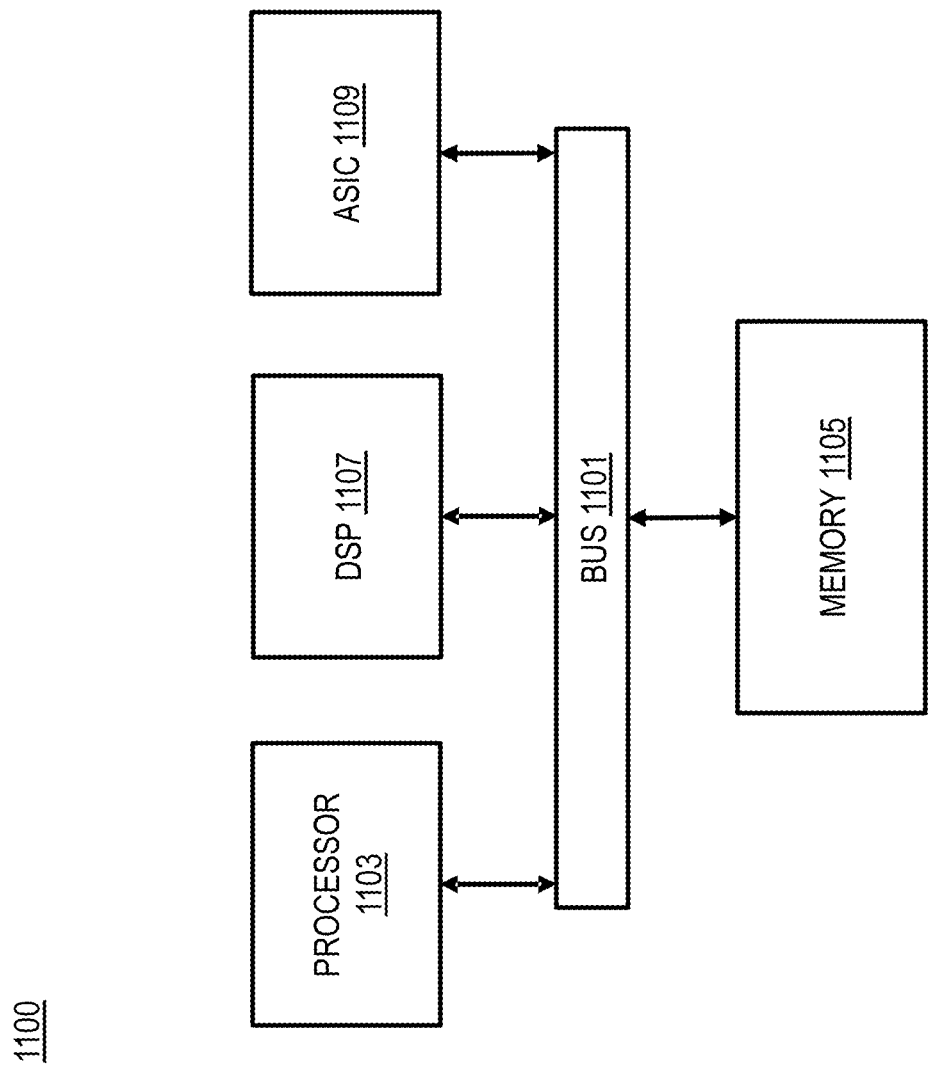
FIG. 11 is a diagram of a chip set that can be used to implement an embodiment.

FIG. 4 is a flowchart of a process for providing navigation guidance for incomplete maps, according to one embodiment. In various embodiments, the map platform 101 and/or any of the modules 301-309 of the map platform 101 as shown in FIG. 3 may perform one or more portions of the process 400 and may be implemented in, for instance, a chip set including a processor and a memory as shown in FIG. 11. As such, the map platform 101 and/or any of the modules 301-309 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps.

In step 401, the confidence module 303 calculates a confidence level of one or more links of the navigation route based on a completeness of map data in an area (e.g., routing area 109) including the navigation route. In one embodiment, the confidence module 303 calculates the confidence level for an attribute of the one or more links of the navigation route. The attribute includes, for instance, an existence of a link on the navigation route, a bi-directionality of the link, and/or any other attribute of the link. The confidence level indicates a certainty of link, the link's attribute, corresponding map data, and/or the like, and can be based on the extent that collected probe data indicates the probability that the link or its attribute value reflects a ground truth condition. For example, the confidence or certainty of a link can depend on the number of probe samples that confirm the link or its attribute value such that the confidence level increases monotonically with the number of confirming samples. The confidence level can also be calculated as an aggregate of multiple attributes or individually for each attribute of the link. In one embodiment, the completeness or incompleteness of the map data can also be a parameter for determining the confidence level and can be based determining that probe data is not available for the area or that the probe data is available for only a subset of the one or more links in the area. In yet another embodiment, the confidence level can also depend on detecting some types of maneuvers indicated in the probe data. For example, maneuvers such as but not limited to diving backwards, making U-turns, circling in an area, etc. may indicate that the map data for corresponding road links can be problematic. Accordingly, the confidence module 303 can compute a lower confidence when there is a concentration of such maneuvers on a road link of interest.

Although various embodiments are discussed with respect to providing variable navigation guidance commands for incomplete maps of indoor parking structures with driving as the mode of transportation, it is contemplated that the embodiments described herein are applicable to any type of routing area 109 with incomplete map data including outdoor and indoor areas using any mode of transportation (e.g., walking, bicycling, public transport, etc.). For example, the navigation route of interest can traverse areas such as a facility with incomplete map data including but not limited to a parking facility, an indoor facility, an open space (e.g., unmapped parks or other terrain), or a combination thereof. In addition, the completeness of map data can also be specific to the mode of transport. For example, a level of completeness for one transport mode (e.g., a car) does not mean the same level of completeness for another mode (e.g., pedestrian, public transport, etc.). As a result, in one embodiment, the confidence levels for a given path, facility, etc. can be computed independently for each mode of transport to generated navigation commands at different specificity levels based on the mode. In one use case, the routing area 109 can be a parking structure 201 including a plurality of parking spots connected by one or more links, and wherein the map data for the parking structure is incomplete with respect to mapping of the plurality of parking spots and of the one or more links. However, it is contemplated that the embodiments are also applicable to any area with incomplete maps (e.g., in countries with poor map coverage, parks, non-road areas, inside buildings, etc.).

In step 403, the command generator 305 determines a specificity level of a navigation guidance command based on the confidence level. In one embodiment, the specificity level for the navigation guidance command increases with the confidence level for the attribute of the one or more links of the navigation route. The command generator 305 can employ any number of specificity levels that vary the level of details provided in a navigation guidance command and/or the representation of the guidance command (e.g., a visual representation, audio representation, spoken word representation, etc.). For example, a first level of the specificity level can be a directional heading specificity that results in generating the navigation guidance command to indicate only a general directional heading to travel towards to reach a destination, waypoint, landmark, etc. of the navigation route. A second level of the specificity level can be a turn specificity that results in generating the navigation guidance command to indicate that a driver should take a next available turn to reach the destination, waypoint, landmark, etc. without identifying a specific link on which to make a next maneuver. A third level of the specificity level can be a standard or traditional specificity that results in generating the navigation guidance command to indicate the specific link on which to make the next maneuver.

In step 405, the command generator 305 generates the navigation guidance command at the determined specificity level. In other words, the command generator 305 can select the wording, detail, etc. to represent a navigation guidance command at the specificity level corresponding to the confidence level of the route and/or the links of the route to which the navigation command applies. In one embodiment, the command generator 305 can further tailor the guidance command based on the particular attribute of the link or route used for determining the confidence level and ultimately the specificity level for the command. In this way, the generated navigation guidance command can reflect the certainty of a link attribute. Table 1 below illustrates example navigation guidance commands generated at different levels of specificity based on a path directionality attribute, and Table 2 below illustrates example navigation guidance commands generated at different levels of specificity based on an attribute indicating whether the link exists.

TABLE 1

| Confidence Level/Probability Index based on Path Directionality Attribute | Example of Command |
|---|---|
| Ex: 100% sure that a path is a one-way street (e.g., 20 of 20 probe vehicles drove one way on the path) | "In 20 m turn right" |
| Ex: 60% sure that a path is one-way street (e.g., 20 of 22 probe vehicles drove one way, and 2 of 22 probe vehicles drove the opposite way on the path; it is noted that the calculated confidence or probability need not be necessarily linear with respect to the probe observations, and the map platform 101 can use any function or correlation to compute a confidence from probe observations) | "At the next possibility, turn right" (as there is also another known possible right turn after that) or "At the next intersection, turn right if possible" |
| Ex: 0% confidence (e.g., no probe data available for the path) | "Drive toward your right when possible" |

TABLE 2

| Confidence Level/Probability Index based on Path Directionality Attribute | Example of Command |
|---|---|
| Ex: 100% sure that a path is exists (e.g., 20 of 20 probe vehicles drove the path) | "In 20 m turn right" |
| Ex: 60% sure that a path exists (e.g., only 2 probe vehicle samples indicate a possible path here) | "At the next possibility, turn right" (as there is also another known possible right turn after that) or "At the next intersection, turn right if possible" |
| Ex: 0% confidence (e.g., no probe data available for the path) | "Drive toward your right when possible" |

As shown in Table 1 above, when the confidence level of the path directionality attribute is high (e.g., 100% sure), the command generator 305 generates a navigation guidance command (e.g., "In 20 m turn right") that has specific details of about when to turn next. In contrast, when the confidence level is lower (e.g., 60% sure that the next link is a one-way street that may or may not allow the user to turn), the command generator 305 can generate a less specific navigation command (e.g., "At the next possibility, turn right" or similar). Even if the user cannot in fact make the immediate next right (e.g., because of a one-way street that was unknown or unmapped by the map platform 101), the user would still know to make the next right turn as the map platform 101 knows of another possible right turn after the next link. Thus, this navigation is less specific about which exact right turn to take but still specific about taking a right turn. In the 0% confidence level example, the map platform 101 has no available probe to characterize links in the routing area, but knows generally that the intended destination is to the right of the user based on the available map data. As a result, the command generator 305 can advantageously generate a less specific but still informative navigation command (e.g., "Drive toward your right when possible"). This command alerts the driver to look for opportunities to head towards his right without specifying either an exact link or a distance to reach a destination towards the right.

The example of Table 2 is similar to the example of Table 1 with the exception that the criteria for determining the confidence level of the path existence attribute can be different than that used for the path directionality attribute. In one embodiment, to calculate the confidence for the path existence attribute, the map platform 101 determines the number of available probe vehicle samples that indicate the presence of the link (e.g., number of samples that traverse a path that may correspond to a link) and calculates the confidence from the number. For example, if the number of samples is greater than a minimum threshold, the confidence can be calculated as 100% or another relatively high value. If the number of samples is below the threshold, the confidence can decrease monotonically with the number of samples to 0% confidence where no samples are available.

In one embodiment, the command generator 305 can generate additional information for the user. For example, command generator 305 can provide additional information for users to drive paths with lower confidence levels so that the map platform 101 can collect additional probe data to update map data (e.g., update via the map update module 309). Accordingly, in one example use case, the navigation guidance command is generated to indicate a potential benefit associated with following a less specific navigation guidance command. The potential benefit can include, but is not limited to, a potentially decreased travel time, a potentially increased parking availability, or combination thereof.

This information can be useful for a user to weight the potential benefits of following a less confidence route against the uncertainty of that route.

In step 407, the output module 309 presents the navigation guidance command in a user interface of a navigation device. For example, the navigation guidance command can be presented in any navigation application, system, device, etc. of the vehicle 105 and UE 107. The guidance command can also be presented using any user interface medium including, but not limited to, spoken word instructions, audio cues, visual cues, animation, etc. presented on one or more multiple user devices (e.g., multiple in-vehicle displays, heads-up displays, speakers, etc.).

Figure 5A:
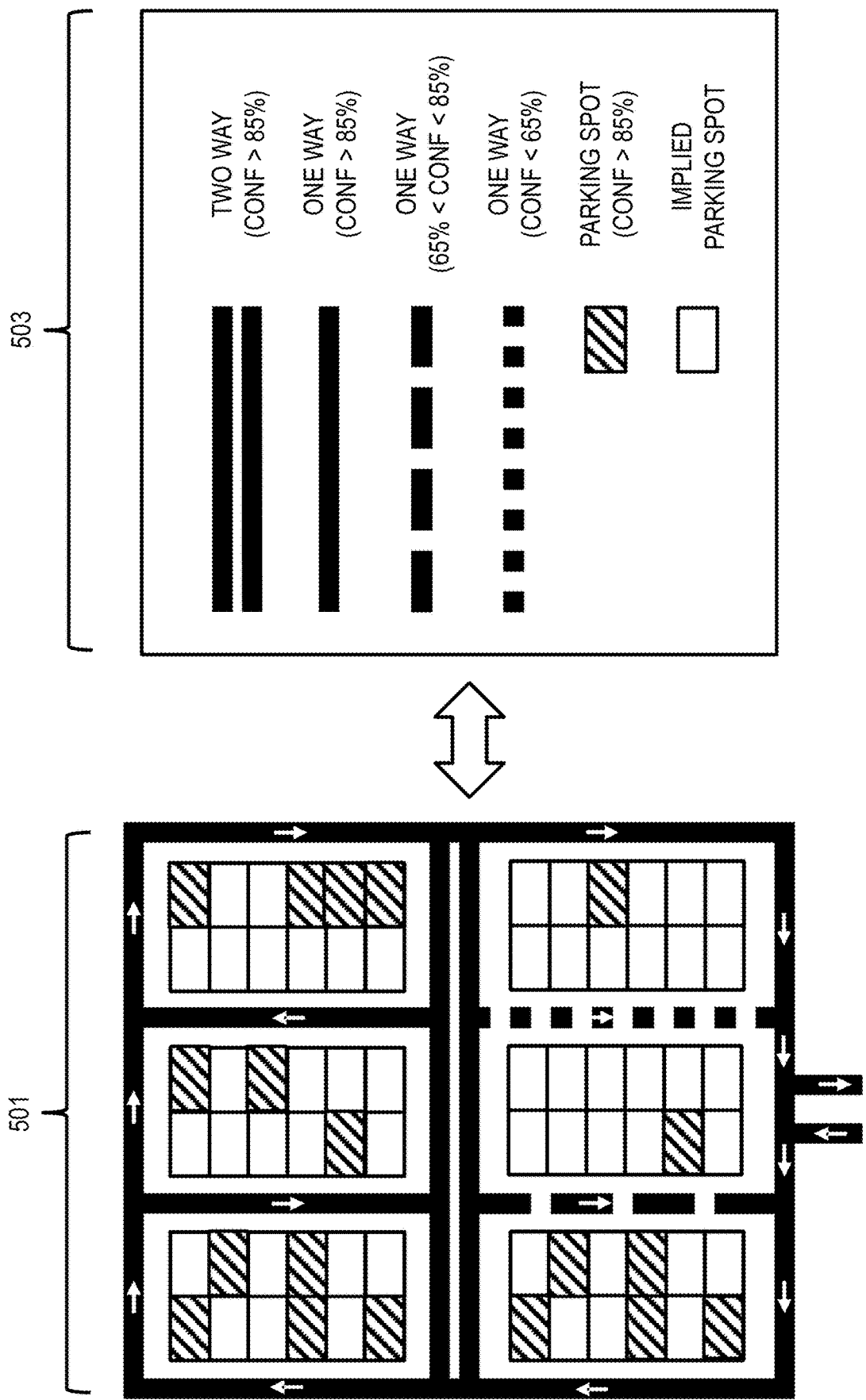
FIGS. 5A and 5B are diagrams of illustrating an area with incomplete map data, according to one embodiment.

The examples of FIGS. 5A-7 illustrate example user interfaces for presenting navigation guidance commands for routing in areas with incomplete maps. These examples are based on a navigation route calculated in a routing area that is an indoor parking structure 501 as shown in FIG. 5A. The parking structure 501 is illustrated to indicate the completeness of the map data representing the road links or paths as well as the parking spots in the parking structure 501. The illustration of the parking structure 501 uses the legend 503 to indicate the confidence levels of each of the components (e.g., as determined from probe data). For example, a solid double line indicates that a path in the parking structure 501 is a two-way path with greater than 85% confidence, a single solid line indicates a one-way path with greater than 85% confidence, a single dashed line with longer dashes indicates a one-way street with a confidence between 65% and 85%, and single dashed line with shorter dashes indicates a one-way street with a confidence below 65%. A confirmed or validated parking spot (e.g., confirmed via probe data) with a confidence greater than 85% is marked by shaded rectangular boxes. Implied parking spots that have not been confirmed via probe data (e.g., having no or less than a minimum number of confirming probe samples) but are likely to be presented based on the parking structure 501's geometry are indicated by unshaded rectangular boxes.

Figure 5B:
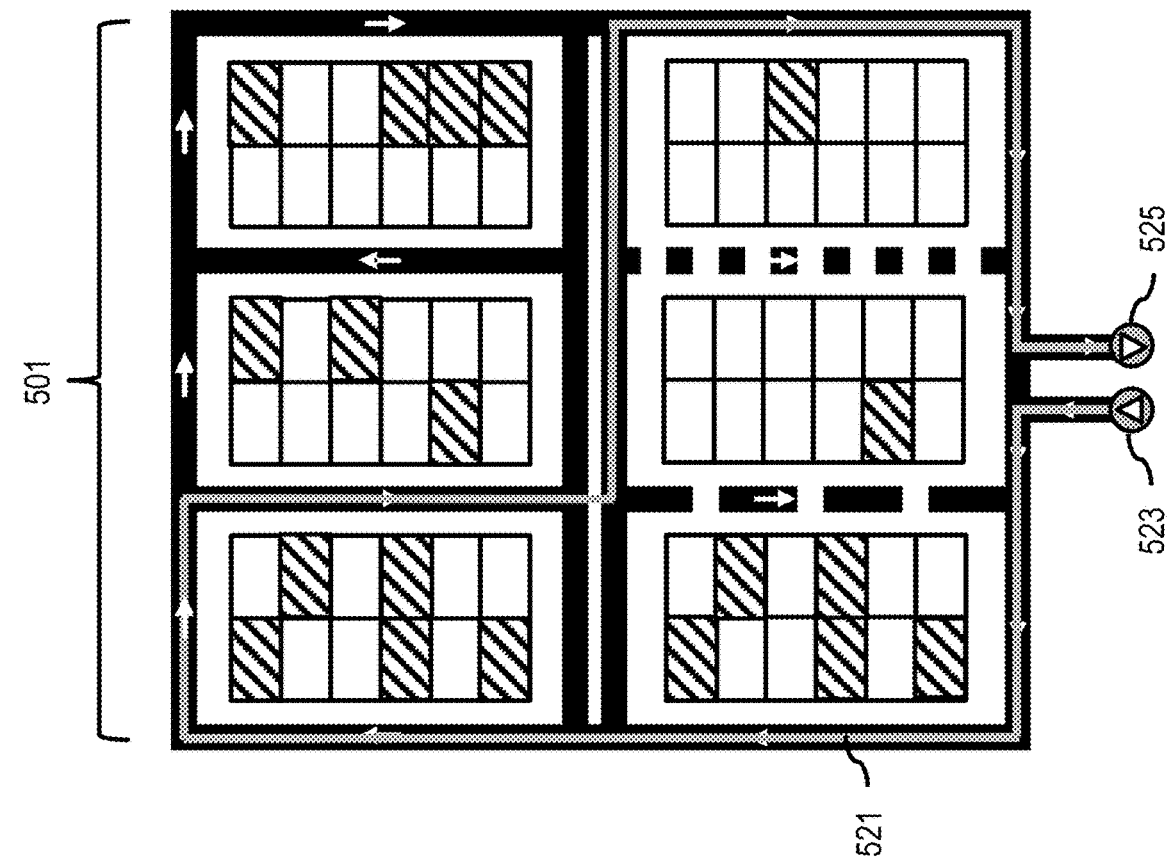

In one embodiment, the routing module 301 can calculate a navigation route through the parking structure 501 (or any other routing area 109) based on the confidence level of the one or more links. With respect to a parking structure, the routing module 301 can also consider a popularity of one or more of the plurality of parking spaces, a connectivity to an uncertain area of the parking structure, a potential for parking availability in an area of the parking structure, or a combination thereof. FIG. 5B illustrates an example route 521 through the parking structure that follows only high confidence paths from an entrance 523 to an exit 525 of the parking structure 501. In other words, the example route 521 excludes any low confidence level links from the route.

Figure 6A:
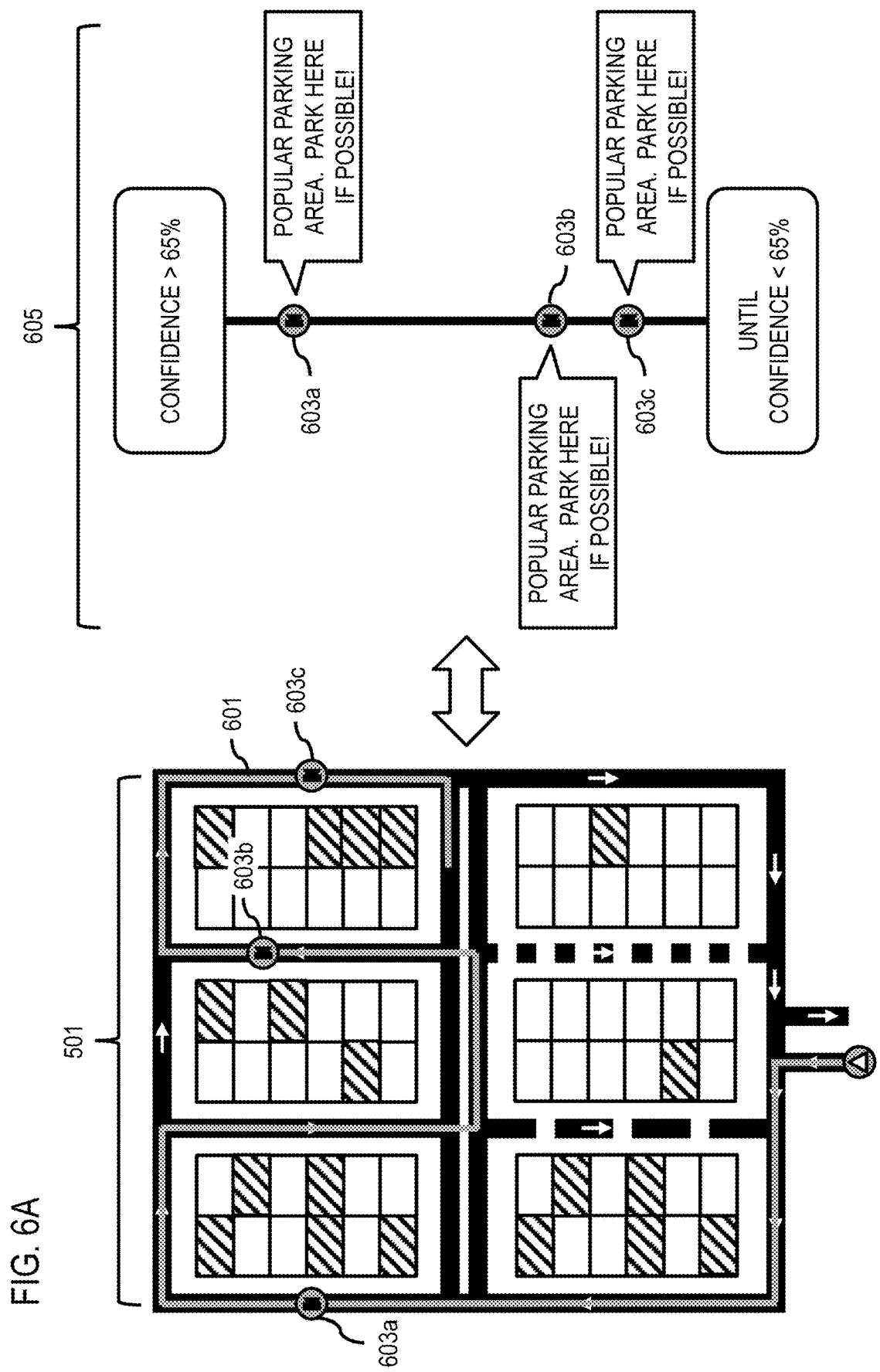
FIGS. 6A-6C are diagrams illustrating an example of providing navigation guidance for an open-ended parking search route (i.e., an infinity route) through an area with incomplete map data, according to one embodiment.

In one embodiment, the routing module 301 can calculate a navigation route through the parking structure 501 to search for parking. This type of route can be an open-ended parking search route (e.g., infinity route) through the parking structure that circles within the parking structure 501 until the driver finds a parking spot. The routing module 301, or instance, can automatically detect when a driver or user enters the parking structure 501 or other routing area 109 and initiate the calculation of this infinity route automatically without specific intervention (e.g., when configured to do so by the user). In one embodiment, this type of navigation route is calculated to include a first section (e.g., a section 601 as shown in FIG. 6A) comprising the one or more links for which the confidence level is above a first threshold confidence (e.g., 65% in this example). The first section 601 can extend until there are no further links with a confidence above this first threshold. For this first section 601, the specificity level of the navigation guidance command can be a high specificity level when the driver is traveling on the one or more links for which the confidence level is above the first threshold confidence. The one or more links in the section 601 can be prioritized in the infinity route based on the popularity of the one or more of the plurality of parking spots that are accessed from the one or more links in the first section. In one embodiment, the output module 307 can present navigation guidance commands 603a-603c at various locations in the first section 601 (e.g., commands generated at a high specificity level such as "turn right in 20 m"). In addition, as shown in the pop out illustration 605, the commands 603a-603c can include parking related information (e.g., "Popular parking area. Park here if possible!") based on mapped information about the validated parking spots in the corresponding areas of the parking structure 501.

Figure 6B:
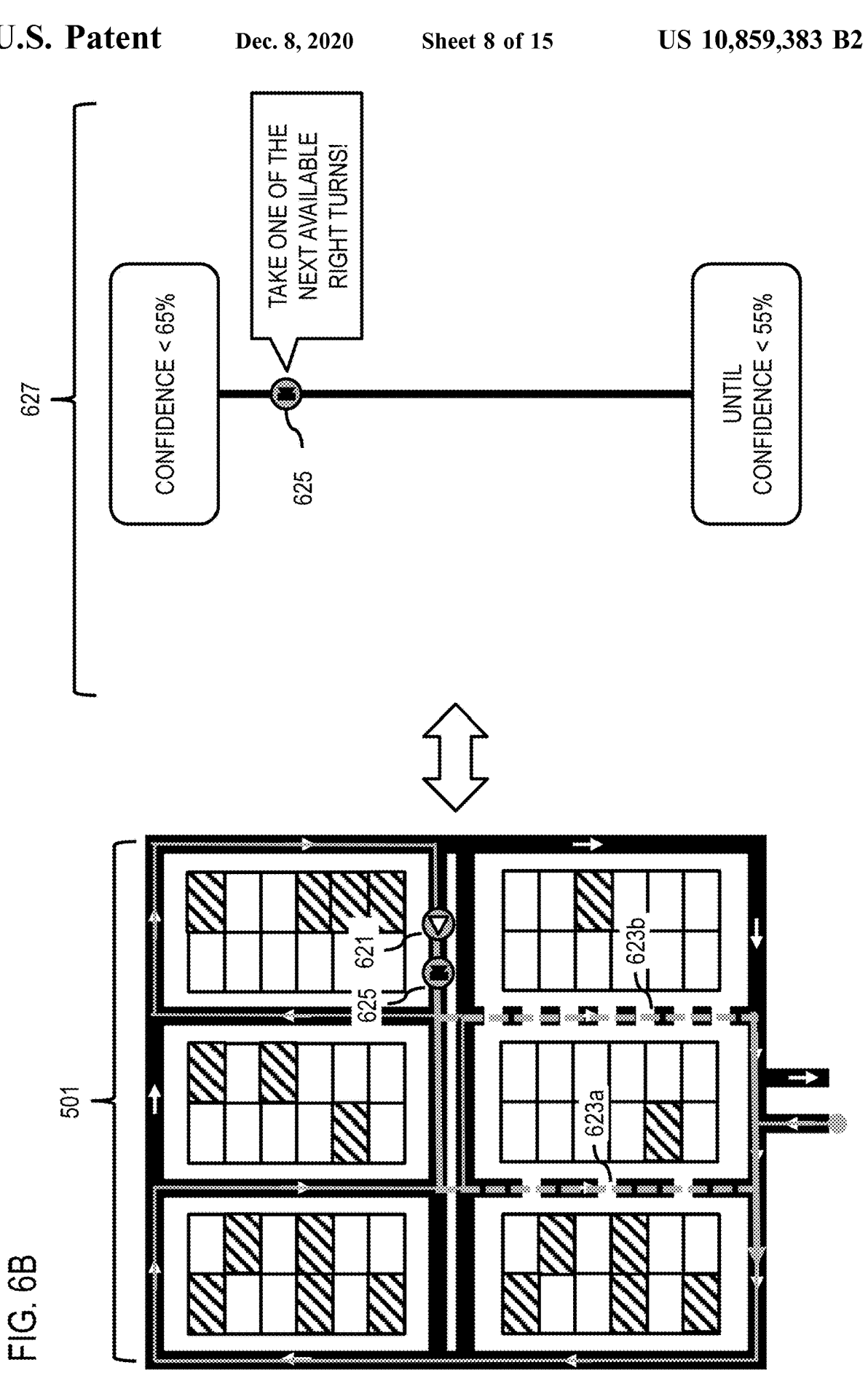

In one embodiment, the infinity route can then be calculated to include a second section 621 as shown in FIG. 6B after the first section 601 of FIG. 6A (e.g., illustrated using a thin line in the FIG. 6B). The second section 621 comprises the one or more links for which the confidence level is below the first threshold confidence (e.g., 65%) and above a second threshold confidence (e.g., 55%). This second section 621 of the infinity route can include multiple lower confidence paths 623a and 623b as possible path options for the user to follow (e.g., illustrated as dashed route lines). In one embodiment, the specificity level for generating the navigation guidance commands is an intermediate specificity level for the one or more links in the second section 621 for which the confidence level is below the first threshold confidence and above the second threshold confidence. For example, the intermediate specificity level can be less specific as to which of the possible paths options 623a and 623b the driver can take. In this example, a guidance command 625 can be presented before the user reaches the two possible path options. As shown in the pop out illustration 627, the intermediate specificity guidance command 625 can state "Take one of the next available right turns!" so that the driver can be alerted of the upcoming path possibilities with being specific as to which of the two the driver should take.

Figure 6C:
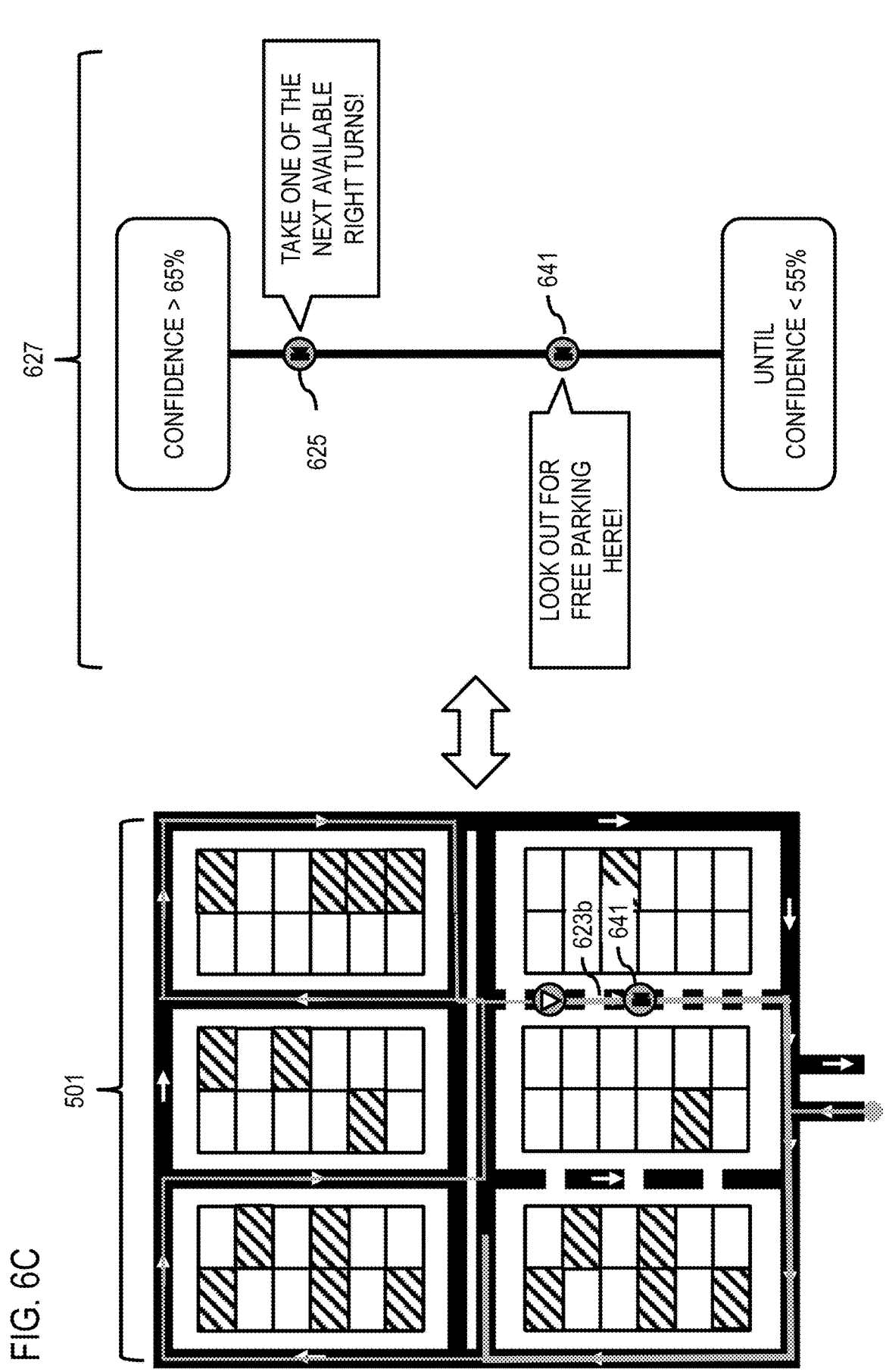

As shown in FIG. 6C, the output module 307 can present an incentive message 641 in association with the navigation guidance command to encourage the driver to explore a potentially lower confidence path. For example, the incentive message indicates the potential for parking availability in the area of the parking structure 501 associated with the second section, the third section, or a combination thereof. In this case, the incentive message states "Look out for free parking here!" if the user takes the optional lower confidence path 623b.

In one embodiment, the infinity route can continue to through lower confidence paths before ultimately looping back to the higher confidence paths to continue the open-ended parking search (e.g., open-ended until the user finds a parking spot). For example, the infinity route can then be calculated to include a third section (not shown) after the second section 621. The third section comprises the one or more links for which the confidence level is below the second threshold confidence (e.g., 55%). Similarly, the specificity level of the navigation guidance command is a low specificity level for the one or more links for which the confidence level is below the second threshold confidence. This lower specificity level may result, for instance, in generating a navigation guidance that states "Drive towards the left side of the parking structure to find more parking" or similar.

Figure 7:
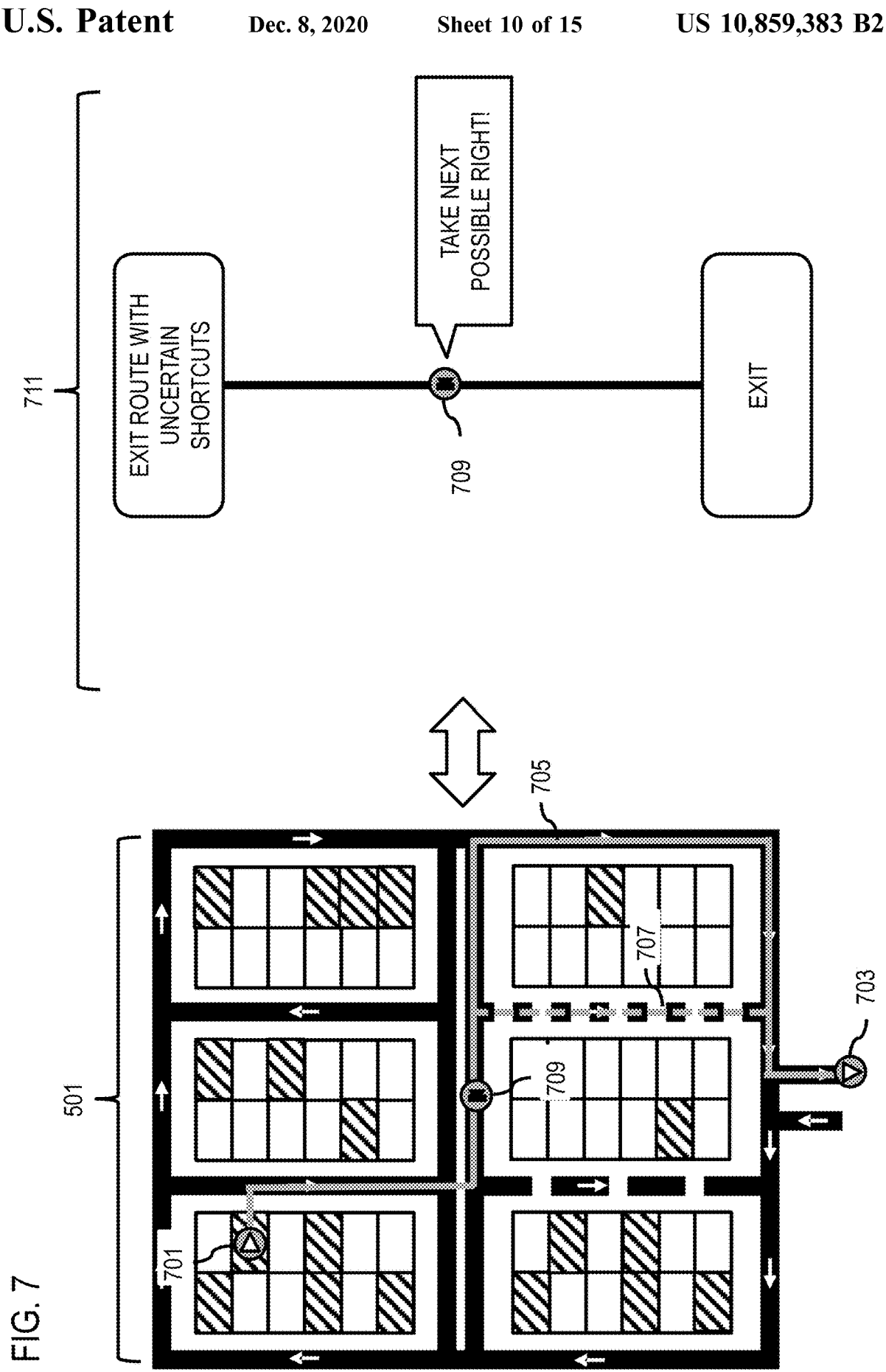
FIG. 7 is a diagram illustrating an example of providing navigation guidance to exit an area with incomplete map data, according to one embodiment.

As noted above, an infinity route is just one example type of route that can be calculated for incomplete maps. Another example route can be based on routing towards a known exit of the parking structure 501 with incomplete map data as shown in FIG. 7. In the example of FIG. 7, a driver has parked in a parking spot 701 of the parking structure 501 and is now planning on exiting the parking structure 501. To assist the driver in exiting the parking structure 501, the map platform 101 can initiate the embodiments for generating navigation guidance instructions for incomplete maps as described with respect to FIG. 8.

Figure 8:
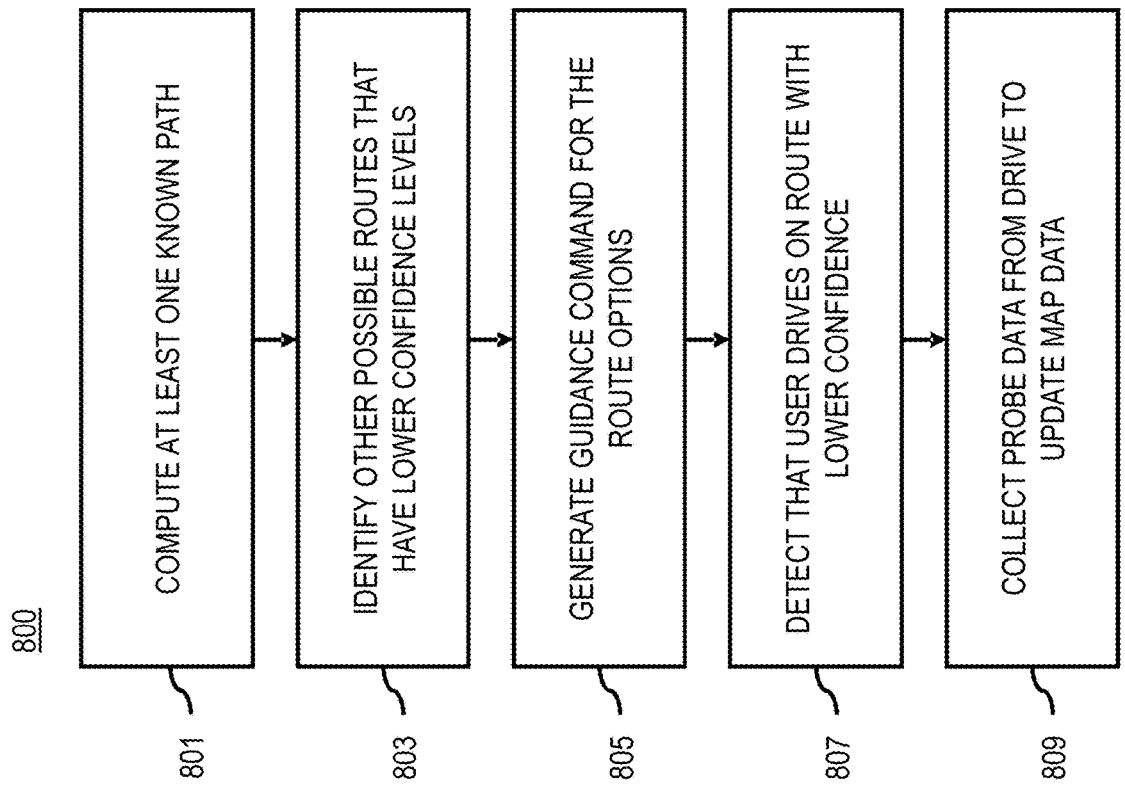
FIG. 8 is flowchart of a process of routing in an area with incomplete map data, according to one embodiment.

FIG. 8 is flowchart of a process of routing in an area with incomplete map data, according to one embodiment. In various embodiments, the map platform 101 and/or any of the modules 301-309 of the map platform 101 as shown in FIG. 3 may perform one or more portions of the process 800 and may be implemented in, for instance, a chip set including a processor and a memory as shown in FIG. 11. As such, the map platform 101 and/or any of the modules 301-309 can provide means for accomplishing various parts of the process 800, as well as means for accomplishing embodiments of other processes described herein in conjunction with other components of the system 100. Although the process 800 is illustrated and described as a sequence of steps, its contemplated that various embodiments of the process 800 may be performed in any order or combination and need not include all of the illustrated steps.

With respect to the example of FIG. 7, the process 800 can be initiated manually by the driver or automatically by the map platform 101 to detect that the driver wants to drive towards the exit 703 of the parking structure 501. It is noted that process 800 is not exclusive to the example of FIG. 7 and may be used as a general process for any other type of routing in incomplete map areas.

In step 801, the map platform 101 computes at least one known path from the starting location to a destination. In the example of FIG. 7, the starting location is the parking spot 701 and the ending location is the exit 703 of the parking structure 501. The known path 705 is the path with links associated with confidence levels above a threshold value (e.g., >85%).

In step 803, the map platform 101 identifies other possible routes that have lower confidence levels. For example, the map platform 101 can calculate a route 707 that includes a link with a confidence below the threshold value (e.g., <85%).

In step 805, the map platform 101 generates a navigation guidance command for the route options (e.g., known path 705 and other possible route 707) based on a specificity level that accounts for the confidence of the lower confidence possible route 707. In the example of FIG. 7, the map platform 101 can present a generated guidance command 709 at a location before the different turning options between the known path 705 and the possible route 707. As shown in the pop out illustration 711, the navigation guidance command 709 can be less specific because there are two possible route options and instruct the driver to "Take the next possible right!". In this way, the navigation guidance command 709 can be general enough so that it would be possible for the driver to take the next right onto the possible route 707 if available, or to take the following right onto the known path 705 if the possible route 707 is not available or not desired.

In step 807, the map platform 101 can detect when the driver or user drives on the route associated with the lower confidence level (e.g., choses to drive on the route 707 versus the known path 705). The map platform 101 can then collect probe data from the navigation device (e.g., UE 107), a vehicle 105 associated with the navigation device, or a combination thereof as the navigation device, the vehicle 105, or a combination thereof follows the presented navigation command along the navigation route (step 809). In one embodiment, the probe data can be collected from the entire navigation route or just the sections or portions of the route covering links with confidence levels below the threshold value or values. The map platform 101 can then use the collected probe update to update the confidence level, the attributes, map data, or a combination thereof for the one or more links of the route (e.g., as stored in the geographic database 103).

Returning to FIG. 1, as shown, the system 100 includes a vehicle 105 and/or UE 107 with connectivity to the map platform 101 and the geographic database 103 for providing navigation guidance for incomplete maps according to the embodiments described herein. In one embodiment, the map platform 101, vehicle 105, UE 107, and/or other components of the system 100 have connectivity over the communication network 113 to the services platform 115 that provides one or more services 117 including, but not limited to, mapping services, navigation services, travel planning services, notification services, social networking services, content (e.g., audio, video, images, etc.) provisioning services, application services, storage services, contextual information determination services, location-based services, information-based services (e.g., weather, news, etc.), etc.

In one embodiment, the map platform 101, vehicle 105, UE 107, and/or other components of the system 100 may be platforms with multiple interconnected components. The map platform 101, vehicle 105, UE 107, and/or other components of the system 100 may include multiple servers, intelligent networking devices, computing devices, components and corresponding software for providing parametric representations of lane lines. In addition, it is noted that the map platform 101 may be a separate entity of the system 100, a part of the one or more services 117, a part of the services platform 115, or included within the UE 107 and/or vehicle 105.

In one embodiment, content providers 119a-119m (collectively referred to as content providers 119) may provide content or data (e.g., including learned traffic sign data or other geographic data) to the geographic database 103, the map platform 101, the services platform 115, the services 117, the UE 107, the vehicle 105, and/or an application 111 executing on the UE 107. The content provided may be any type of content, such as navigation guidance, map content, textual content, audio content, video content, image content, etc. In one embodiment, the content providers 119 may provide content that may aid in the computing confidence levels of road links and their attributes from sensor data (e.g., probe data) to determine the specificity of navigation guidance commands. In one embodiment, the content providers 119 may also store content associated with the geographic database 103, map platform 101, services platform 115, services 117, UE 107, and/or vehicle 105. In another embodiment, the content providers 119 may manage access to a central repository of data, and offer a consistent, standard interface to data, such as a repository of the geographic database 103.

In one embodiment, the UE 107 and/or vehicle 105 may execute a software application 111 to generate navigation guidance for incomplete maps including collecting probe data for generating map data according the embodiments described herein. By way of example, the application 111 may also be any type of application that is executable on the UE 107 and/or vehicle 105, such as autonomous driving applications, mapping applications, location-based service applications, navigation applications, content provisioning services, camera/imaging application, media player applications, social networking applications, calendar applications, and the like. In one embodiment, the application 111 may act as a client for the map platform 101, services platform 115, and/or services 117 and perform one or more functions associated with generating navigation guidance for incomplete maps.

By way of example, the UE 107 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 107 can support any type of interface to the user (such as "wearable" circuitry, etc.). In one embodiment, the UE 107 may be associated with the vehicle 105 or be a component part of the vehicle 105.

In one embodiment, the UE 107 and/or vehicle 105 are configured with various sensors (e.g., sensors 121) for generating or collecting probe data, environmental sensor data, related geographic data, etc. including but not limited to, optical, radar, ultrasonic, LiDAR, etc. sensors. In one embodiment, the sensed data represent probe data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 107 and/or vehicle 105 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 107 and/or vehicle 105 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 107 and/or vehicle 105 may include GPS or other satellite-based receivers to obtain geographic coordinates from satellites 123 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the map platform 101, services platform 115, services 117, UE 107, vehicle 105, and/or content providers 119 communicate with each other and other components of the system 100 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
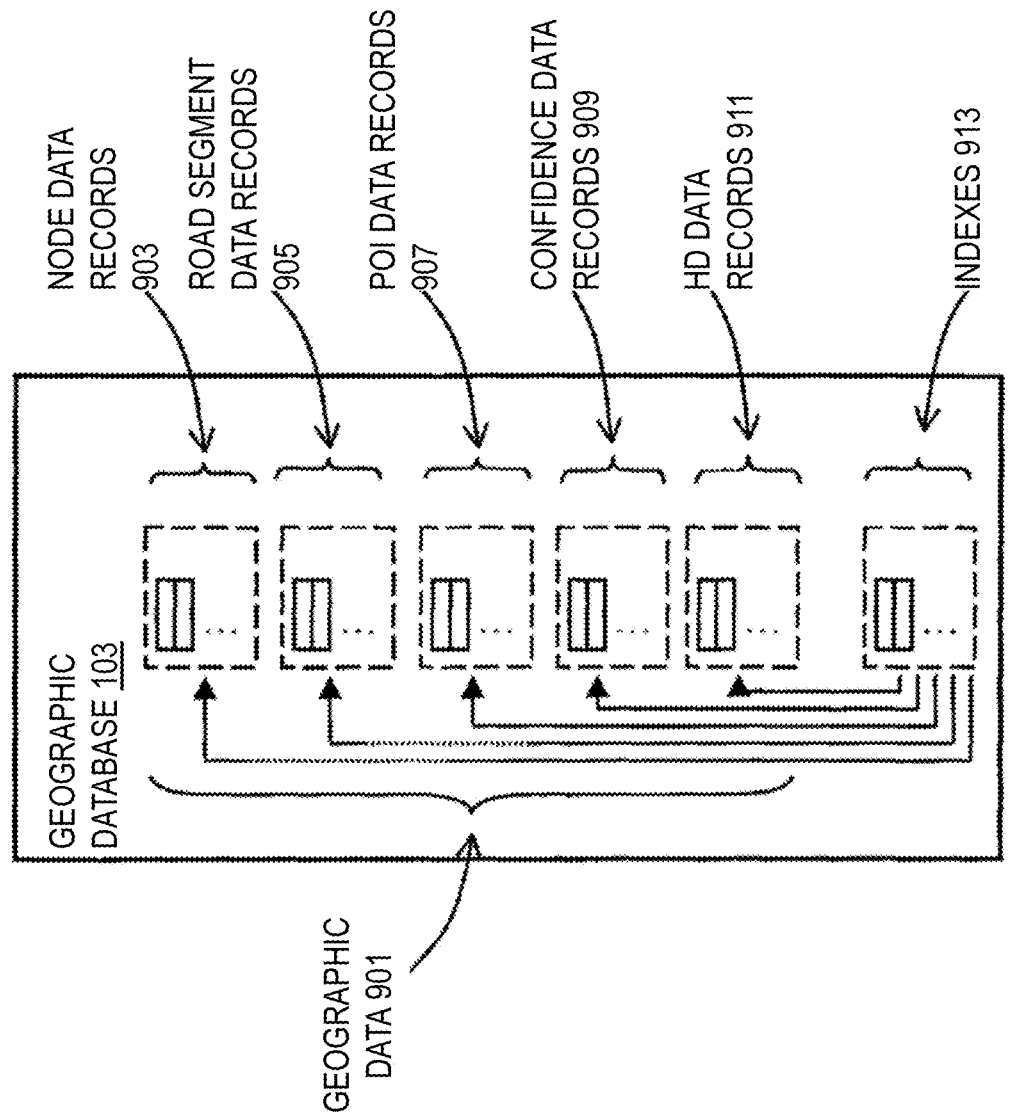
FIG. 9 is a diagram of a geographic database, according to one embodiment.

FIG. 9 is a diagram of a geographic database 103, according to one embodiment. In one embodiment, the geographic database 103 includes geographic data 901 used for (or configured to be compiled to be used for) mapping and/or navigation-related services, such as for video odometry based on the parametric representation of lanes include, e.g., encoding and/or decoding parametric representations into lane lines. In one embodiment, the geographic database 103 include high resolution or high definition (HD) mapping data that provide centimeter-level or better accuracy of map features. For example, the geographic database 103 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 103.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 103 follows certain conventions. For example, links do not cross themselves and do not cross each other except at a node. Also, there are no duplicated shape points, nodes, or links. Two links that connect each other have a common node. In the geographic database 103, overlapping geographic features are represented by overlapping polygons. When polygons overlap, the boundary of one polygon crosses the boundary of the other polygon. In the geographic database 103, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the geographic database 103 is stored as a hierarchical or multi-level tile-based projection or structure. More specifically, in one embodiment, the geographic database 103 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

As shown, the geographic database 103 includes node data records 903, road segment or link data records 905, POI data records 907, confidence data records 909, HD mapping data records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 103. In one embodiment, the indexes 913 may be used to quickly locate data without having to search every row in the geographic database 103 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 103 can contain path segment and node data records or other data that represent pedestrian paths or areas in addition to or instead of the vehicle road record data, for example.

The road/link segments and nodes can be associated with attributes, such as geographic coordinates, existence, bi-directionality, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 103 can include data about the POIs and their respective locations in the POI data records 907. The geographic database 103 can also include data about places, such as parking structures, indoor areas, buildings, cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 103 can also include confidence data records 909 for storing computed confidence levels, specificity levels, generated navigation guidance commands, probe data, and/or any other data related to providing navigation guidance for incomplete maps according to the embodiments described herein. For example, the confidence data records 909 can also store confidence or accuracy determinations for any other data stored in the geographic database 103. By way of example, the confidence data records 909 can be associated with one or more of the node records 903, road segment records 905, and/or POI data records 907 to support the embodiments described herein. In one embodiment, the confidence data records 909 are stored as a data layer of the hierarchical tile-based structure of the geographic database 103.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 105 and other end user devices with near real-time speed without overloading the available resources of the vehicles 105 and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 103 can be maintained by the content provider 119 in association with the services platform 115 or the map platform 101 (e.g., a map developer). The map developer can collect geographic data to generate and enhance the geographic database 103. There can be different ways used by the map developer to collect data. These ways can include obtaining data from other sources, such as municipalities or respective geographic authorities. In addition, the map developer can employ field personnel to travel by vehicle (e.g., vehicle 105 and/or UE 107) along roads throughout the geographic region to observe features and/or record information about them, for example. Also, remote sensing, such as aerial or satellite photography, can be used.

The geographic database 103 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 105 or UE 107. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for generating navigation guidance for incomplete maps may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
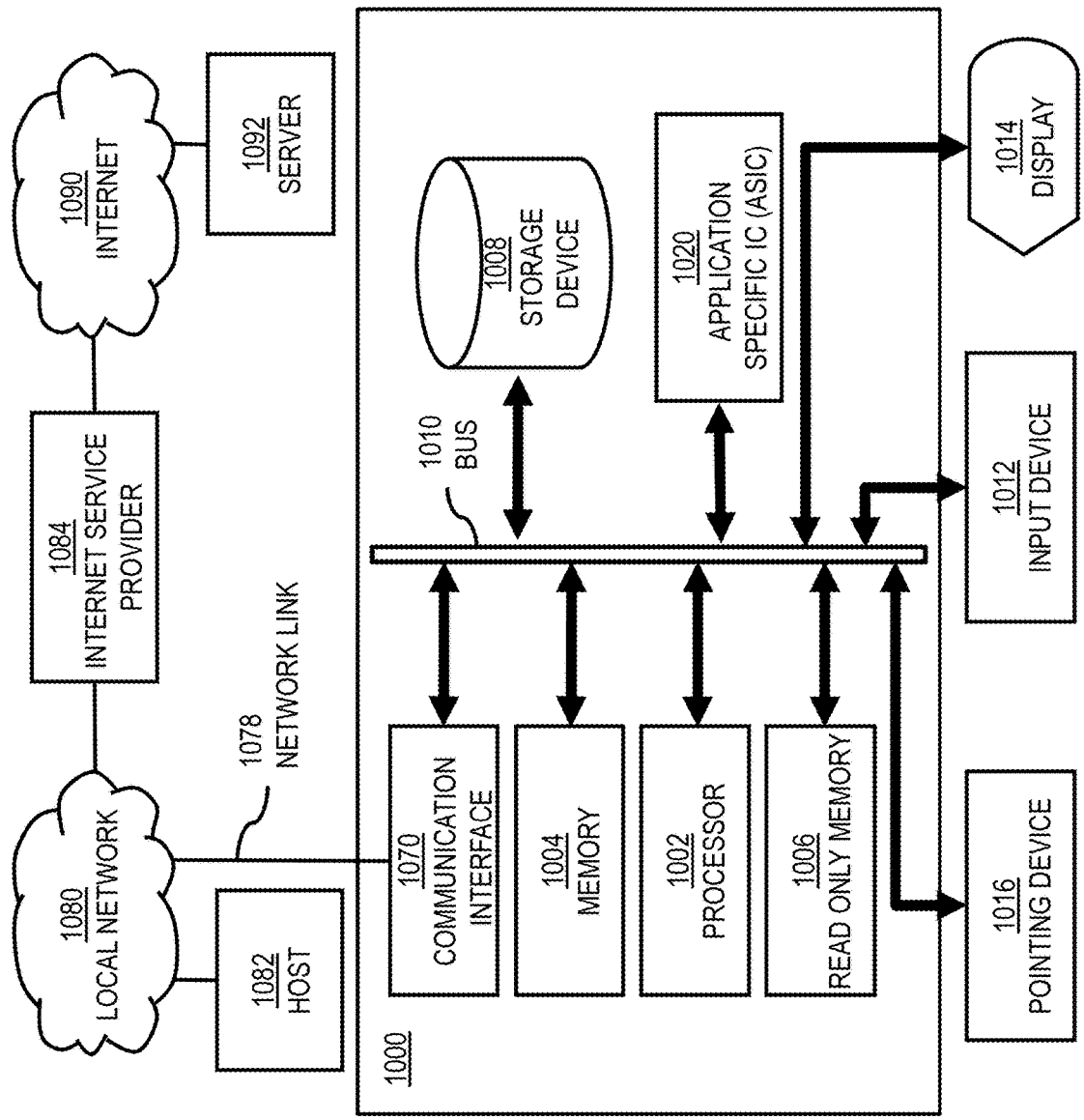
FIG. 10 is a diagram of hardware that can be used to implement an embodiment.

FIG. 10 illustrates a computer system 1000 upon which an embodiment may be implemented. Computer system 1000 is programmed (e.g., via computer program code or instructions) to generate navigation guidance for incomplete maps as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to generating navigation guidance for incomplete maps. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for generating navigation guidance for incomplete maps. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for generating navigation guidance for incomplete maps, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general, the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 113 for generating navigation guidance for incomplete maps.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment may be implemented. Chip set 1100 is programmed to generate navigation guidance for incomplete maps as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to generate navigation guidance for incomplete maps. The memory 1105 also stores the data associated with or generated by the execution of the inventive steps.

FIG. 12 is a diagram of exemplary components of a mobile terminal 1201 (e.g., a UE 107 and/or component of the vehicle 105) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to generate navigation guidance for incomplete maps. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
   calculating, by a processor, a confidence level of one or more links of a navigation route based on a completeness of map data in an area including the navigation route;
   determining a specificity level of a navigation guidance command based on the confidence level;
   generating the navigation guidance command at the determined specificity level; and
   presenting the navigation guidance command in a user interface of a navigation device.

2. The method of claim 1, wherein the completeness of the map data is based upon determining that probe data is not available for the area or that the probe data is available for only a subset of the one or more links in the area.

3. The method of claim 1, wherein the area is a parking structure including a plurality of parking spots connected by the one or more links, and wherein the map data for the parking structure is incomplete with respect to mapping of the plurality of parking spots and of the one or more links.

4. The method of claim 3, further comprising:
   calculating the navigation route based on the confidence level of the one or more links, a popularity of one or more of the plurality of parking spaces, a connectivity to an uncertain area of the parking structure, a potential for parking availability in an area of the parking structure, or a combination thereof.

5. The method of claim 4, wherein the navigation route is an open-ended parking search route through the parking structure.

6. The method of claim 5, wherein the navigation route is calculated to include a first section comprising the one or more links for which the confidence level is above a first threshold confidence, and wherein the specificity level of the navigation guidance command is a high specificity level for the one or more links for which the confidence level is above the first threshold confidence.

7. The method of claim 6, wherein the one or more links in the section are prioritized in the navigation route based on the popularity of the one or more of the plurality of parking spots that are accessed from the one or more links in the first section.

8. The method of claim 6, wherein the navigation route is calculated to include a second section after the first section, wherein the second section comprises the one or more links for which the confidence level is below the first threshold confidence and above a second threshold confidence, and wherein the specificity level of the navigation guidance command is an intermediate specificity level for the one or more links for which the confidence level is below the first threshold confidence and above the second threshold confidence.

9. The method of claim 8, wherein the navigation route is calculated to include a third section after the second section, wherein the third section comprises the one or more links for which the confidence level is below the second threshold confidence, and wherein the specificity level of the navigation guidance command is a low specificity level for the one or more links for which the confidence level is below the second threshold confidence.

10. The method of claim 9, further comprising:
    presenting an incentive message in association with the navigation guidance command,
    wherein the incentive message indicates the potential for parking availability in the area of the parking structure associated with the second section, the third section, or a combination thereof.

11. The method of claim 9, further comprising:
    collecting probe data from one or more sensors of a vehicle associated with the navigation device as the vehicle travels in the first section, the second section, the third section, or a combination thereof,
    wherein the probe data is used to update the completeness of the map data in the area.

12. An apparatus comprising:
    at least one processor; and
    at least one memory including computer program code for one or more programs,
    the at least one memory and the computer program code configured to, with the at least one processor, cause the apparatus to perform at least the following,
      calculate a confidence level for an attribute of one or more links of a navigation route;
      determine a specificity level for a navigation guidance command based on the confidence level;
      generate the navigation guidance command at the determined specificity level; and
      present the navigation guidance command in a user interface of a navigation device.

13. The apparatus of claim 12, wherein the attribute includes an existence of a link on the navigation route, a bi-directionality of the link, or a combination thereof.

14. The apparatus of claim 12, wherein the specificity level for the navigation guidance command increases with the confidence level for the attribute of the one or more links of the navigation route.

15. The apparatus of claim 12, wherein a first level of the specificity level is a directional heading specificity that results in generating the navigation guidance command to indicate only a general directional heading to travel towards to reach a destination or a waypoint of the navigation route; wherein a second level of the specificity level is turn specificity that results in generating the navigation guidance command to indicate that a driver should take a next available turn to reach the destination or the waypoint without identifying a specific link on which to make a next maneuver; and wherein a third level of the specificity level is a standard specificity that results in generating the navigation guidance command to indicate the specific link on which to make the next maneuver.

16. The apparatus of claim 12, wherein the navigation guidance command is generated to indicate a potential benefit associated with following a less specific navigation guidance command, and wherein the potential benefit includes a potentially decreased travel time, a potentially increased parking availability, or a combination thereof.

17. A non-transitory computer-readable storage medium carrying one or more sequences of one or more instructions which, when executed by one or more processors, cause an apparatus to at least perform the following steps:
   processing map data available for an area of a navigation route to determine a confidence level of one or more links of the navigation route, wherein the confidence level indicates a certainty of the map data for the one or more links;
   determining a specificity level of a navigation guidance command based on the confidence level;
   generating the navigation guidance command at the determined specificity level; and
   presenting the navigation guidance command in a user interface of a navigation device.

18. The non-transitory computer-readable storage medium of claim 17, wherein the navigation route traverses a facility with incomplete map data, and wherein the facility includes a parking facility, an indoor facility, an open space, or a combination thereof.

19. The non-transitory computer-readable storage medium of claim 17, wherein the apparatus is further caused to perform:
   collecting probe data from the navigation device, a vehicle associated with the navigation device, or a combination thereof as the navigation device, the vehicle, or the combination thereof follows the presented navigation command along the navigation route; and
   updating the confidence level, the attribute, map data, or a combination thereof for the one or more links in a geographic database based on the collected probe data.

20. The non-transitory computer-readable storage medium of claim of 17, wherein a first level of the specificity level is a directional heading specificity that results in generating the navigation guidance command to indicate only a general directional heading to travel towards to reach a destination or a waypoint of the navigation route; wherein a second level of the specificity level is turn specificity that results in generating the navigation guidance command to indicate that a driver should take a next available turn to reach the destination or the waypoint without identifying a specific link on which to make a next maneuver; and wherein a third level of the specificity level is a standard specificity that results in generating the navigation guidance command to indicate the specific link on which to make the next maneuver.

\* \* \* \* \*